Patented Oct. 14, 1952

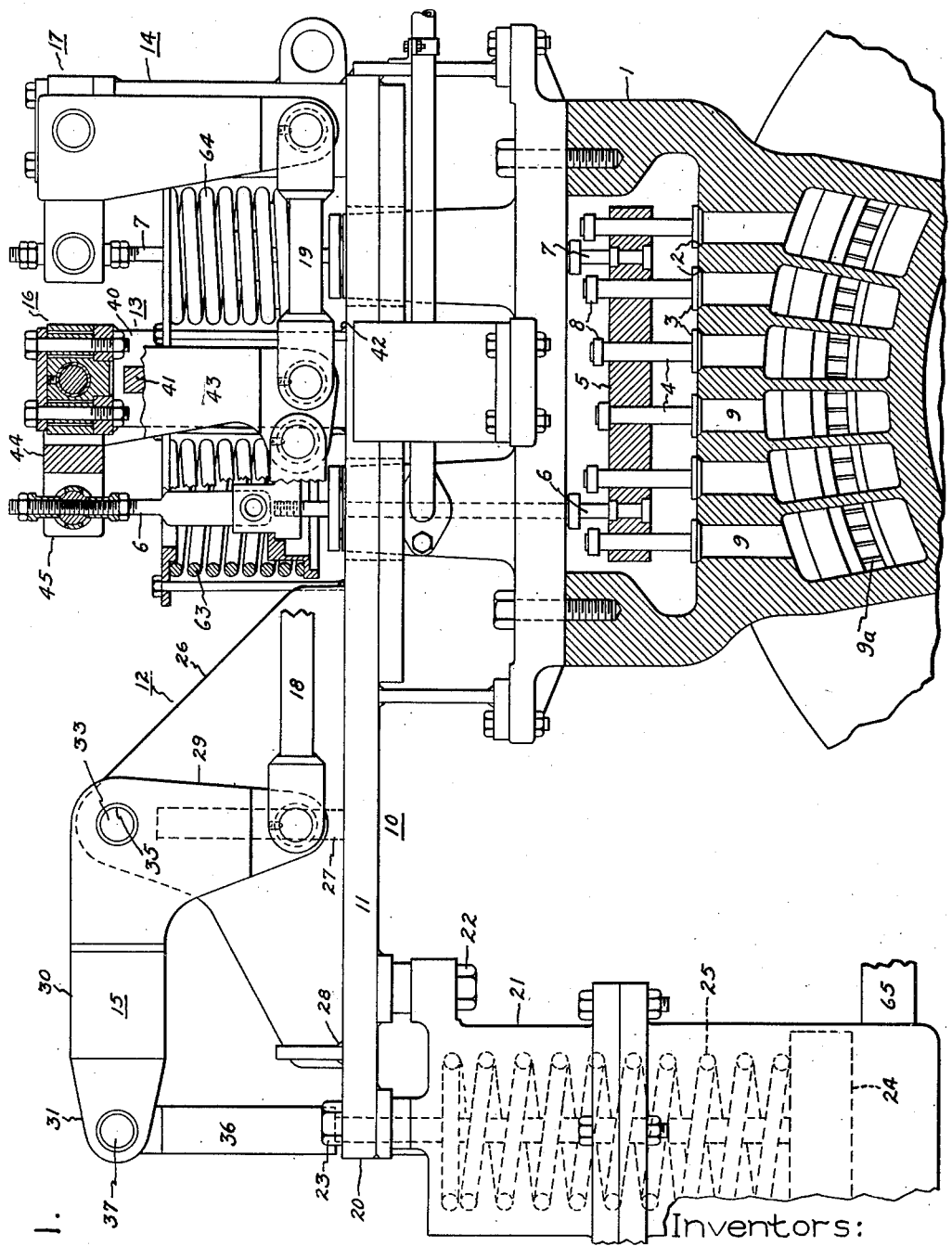

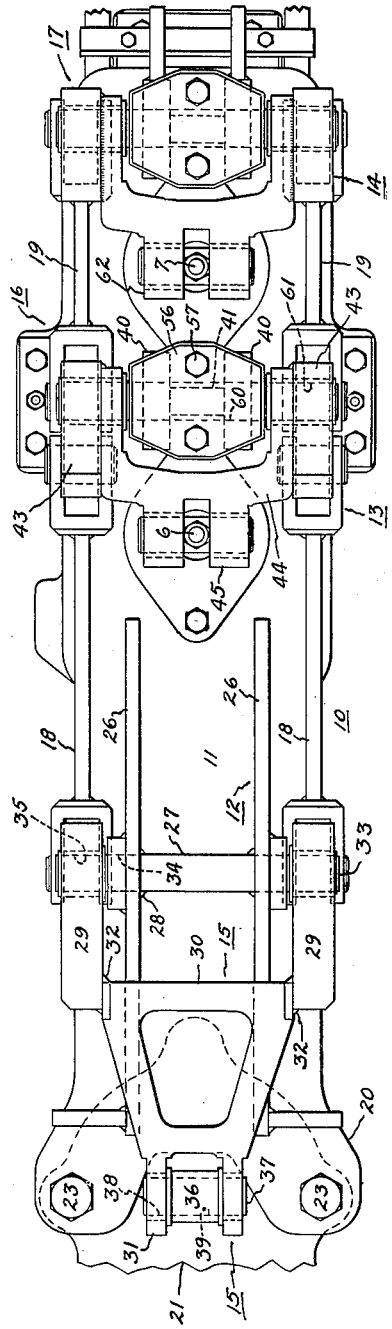

2,613,542

UNITED STATES PATENT OFFICE 2,613,542

VALVE GEAR FOR STEAM TURBINES AND THE LIKE

Francis H. Van Nest and Lawrence B. Wales, Marblehead, Mass., assignors to General Electric Company, a corporation of New York Application March 23, 1949, Serial No. 83,043

3 Claims. (Cl. 74—99)

This invention relates to valve gear and more particularly to an improved valve gear for operating valves in steam turbines or the like.

In steam turbines and the like the admission of steam to the turbine is controlled in a conventional manner by one or more valves operated by one or more valve operating rods positioned in the turbine. The valve operating rods in turn are actuated by an oil hydraulic motor connected to the valve operating rods through a valve gear comprising a mechanical linkage.

In such an arrangement, it is desirable that the loss of motion between the hydraulic motor and the valve operating rods be minimized in order to provide the best speed control of the turbine. In considering the possible loss of motion between the hydraulic motor and the valve operating rods it will be apparent that such loss of motion through a mechanical linkage is proportional to the force applied to the linkage and the flexibility of the linkage. In the case of a steam turbine, the force which must be applied to open the valves under steam pressure is considerable because such force must act in opposition to a considerable pressure of steam tending to bias the valves closed. Therefore, the force transmitted through the linkage operating the valves is considerable and a corresponding rigidity in the linkage must be provided to compensate for the heavy pressure applied thereto.

One conventional method of providing the required rigidity in the linkage is to shorten the overall length of the linkage. This method, although successful insofar as operation of the turbine is concerned, has a disadvantage of fire hazard in that with a short linkage, the hydraulic motor, using oil as an operating fluid, must be mounted close to the steam turbine whose operating steam temperature is above the flash point of the oil in the hydraulic motor and, therefore, any oil leaking from the hydraulic motor on the turbine may cause a fire.

It is an object of our invention to provide a valve gear which will not produce excessive lost motion between the hydraulic motor and the valve operating rods and which will enable the hydraulic motor to be mounted a sufficient distance from the steam turbine to avoid the hazard of igniting any oil which may leak from the hydraulic motor.

It is a further object to provide an improved valve gear of the type described having increased rigidity to prevent inaccuracies of valve operation resulting from flexing of the valve operating links and levers.

In general, our invention consists of a valve gear comprising a main frame plate arranged for mounting on a steam turbine or the like in a projecting manner, a plurality of pedestals secured to the main frame plate, a plurality of members pivotally secured one to each of the pedestals and interconnected by parallel tension members thereby forming a mechanical linkage, means connecting one portion of the linkage to a hydraulic motor mounted on the projecting end of the main frame, and means for connecting another portion of the linkage to a valve operating rod positioned in the turbine.

For a complete understanding of our invention, reference should be had to the following specification and the accompanying drawing in which Fig. 1 is a side view, partly in cross section of my invention as applied to a steam turbine, Fig. 2 is a plan view of Fig. 1, and Fig. 3 is an enlarged view of a portion of Fig. 1 partly in cross-section.

Referring to the drawing, in Fig. 1 we have shown, for the purpose of illustrating our invention, a steam chest 1 of a type found on conventional steam turbines, a plurality of valve seats 2 in the steam chest 1 and a plurality of inlet valves 3. Inlet valves 3 are slidably connected by valve stems 4 to a cross-member 5 which is operated by valve operating rods 6 and 7 secured thereto as shown in Fig. 1. The valve stems 4 are of unequal length and are provided with stops 8 whereby when cross member 5 is raised by the valve operating rods 6 and 7 the various inlet valves 3 are opened in succession to allow steam to flow from steam chest 1 to the various inlet supply lines 9, thereby regulating the amount of steam delivered to the turbine nozzles 9a and consequently regulating the speed of the steam turbine (not shown).

To actuate the valve operating rods 6 and 7 and thereby to operate the inlet valves 3 in accordance with my invention, we provide a valve gear 10 comprising a main frame plate 11, a truss pedestal 12, a first valve pedestal 13, a second valve pedestal 14, a first bell-crank actuating member 15, a second bell-crank actuated member 16, a third bell-crank actuated member 17, a first pair of parallel tension rods 18 pivotally interconnecting the actuating member 15 and the actuated member 16, and a second pair of parallel tension rods 19 pivotally interconnecting the actuated members 16 and 17 respectively.

The main frame plate 11 is made of steel or other suitable material and has an elongated rectangular shape suitable for rigid mounting on steam chest 1 in a projecting manner as shown in Fig. 1. On the projecting end 20 of the main frame plate 11 a conventional spring biased single acting hydraulic motor 21 is secured by studs 22 and 23 or other suitable means. Motor 21 has a piston 24 which is arranged to move in an upward direction under pressure of oil and a spring 25 biasing the piston 24 in the opposite direction.

Truss pedestal 12 is made of steel or other suitable material and comprises two parallel truss plates 26 mounted longitudinally on main frame plate 11 adjacent projecting end 20 thereof and connected by a cross plate 27 as shown in Figs. 1 and 2. Cross plate 27, parallel truss plates 26, and main frame plate 11 are rigidly secured one to the other by means of welds 28 or other suitable means, thereby forming a rigid cantilever beam structure.

Actuating member 15 comprises two parallel arms 29 interconnected by a bridge frame portion 30 having a bifurcated end 31 as shown in Fig. 2. The bridge frame portion 30 is secured to the parallel arms 29 by welds 32 or other suitable means to form an integral rigid structure. The actuating member 15 is pivotally secured to truss pedestal 12 by means of a bearing shaft 33 passing through aligned apertures 34 and 35 located respectively in the parallel truss plates 26 and in the parallel arms 29 of actuating member 15. The bifurcated end 31 of actuating member 15 is pivotally connected to one end of a piston rod 36 by means of a bearing shaft 37 passing through aligned apertures 38 and 39 located respectively in the bifurcated end 31 of actuating member 15 and the one end of piston rod 36. The other end of piston rod 36 is connected in any suitable manner to piston 24 of hydraulic motor 21.

The first valve pedestal 13 is made of steel or other suitable material and comprises two parallel plates 40 connected by a cross-plate 41, as shown in Fig. 2, forming a rigid structure and is secured to main frame plate 11 by welds 42 or other suitable means as shown in Fig. 1.

The first actuated member 16 is similar to actuating member 15 in that it comprises two parallel arms 43, and a bridge frame portion 44 connecting the parallel arms 43 and forming an integral rigid structure with a bifurcated end 45 on the bridge frame portion 44. However, the first actuated member 16 is mounted on the first valve pedestal 13 to allow a limited rotation about a vertical axis as well as a pivotal motion about a horizontal axis. The reason for this will be explained in detail later.

The means for so mounting the first actuated member 16 on the first valve pedestal 13 is best seen in Fig. 3, and comprises a plate 46 positioned horizontally on the two parallel plates 40 of the first valve pedestal 13 and secured thereto by welds 47 or other suitable means. Plate 46 is centrally apertured as at 48 to accommodate a cylindrical boss 49 centrally located on the lower surface 51 of a fulcrum block 50, thereby allowing the fulcrum block to move about a vertical axis through the cylindrical boss 49. To loosely secure the fulcrum block 50 on plate 46, fulcrum block 50 is apertured as at 52 and 53 and cylindrical spacing collars 54 and 55, each having a length greater than the height of the fulcrum block 50 and an external diameter less than the diameter of apertures 52 and 53, are loosely positioned therein. A second plate 56 is positioned above the fulcrum block 50, is supported by the spacing collars 54 and 55 and together with plate 47 and two bolts 57 passing through aligned apertures of the cylindrical spacing collars 54 and 55 and nuts 58 loosely secure the fulcrum block 50 on the first valve pedestal 13. As so secured, fulcrum block 50 has freedom of motion about a vertical axis through the cylindrical boss 49 which motion is limited by the difference in diameters of apertures 52 and 53 and the associated spacing collars 54 and 55 positioned therein.

To provide the first actuated member 16 with limited motion about a vertical axis and pivoted motion about a horizontal axis, the first actuated member 16 is pivotally connected to the fulcrum block 50 by means of a bearing shaft 59 passing through aligned apertures 60 and 61 located respectively in the fulcrum block 50 and the parallel arms 43 of the first actuated member 16.

Actuating member 15 is connected to the first actuated member 16, as best shown in Fig. 2, by means of the first pair of parallel tension members 18. Considering the action of tension members 18, it will be obvious that if one of the members 18 were heated more than the other by reason of the steam in steam chest 1 or in a turbine connected thereto, such unequal heating of members 18 would cause one member 18 to be elongated with respect to the other member 18 with the consequent result of a twisting effect on first actuated member 16, bearing shaft 59, and the first valve pedestal 13. Such twisting would produce detrimental stress, binding and wearing of the members mentioned, and it is for this reason that means has been provided, as previously described, allowing limited oscillation of first actuated member 16 about a vertical axis to compensate for such unequal expansion of the tension members 18.

So far we have described the portion of our valve gear necessary to operate one valve operating rod such as 6. If the turbine has only one valve operating rod, as may be the case, no further structure is necessary. However, if the turbine has a plurality of valve operating rods, then additional actuated members, such as the second actuated member 17, is provided and mounted on the second valve pedestal 14, as shown in Figs. 1 and 2. The second actuated member 17 is similar in structure to the first actuated member 16 and is mounted on second valve pedestal 14 by a fulcrum block in the same manner as described for the first actuated member 16 to provide pivotal motion about a horizontal axis and limited rotation about a vertical axis. The first and second actuated members are interconnected by a second pair of parallel tension members 19, as shown in Fig. 2, and a bifurcated end 62 on the second actuated member 17 is pivotally connected to valve operating rod 7.

Valve operating rods 6 and 7 are biased in a downward or valve closing direction in a conventional manner by means of respective springs 63 and 64.

To understand the operation of the valve gear 10 as above described, attention is now directed to Fig. 1. To open inlet valves 3 in steam chest 1, piston 24 is moved in an upward direction by oil under pressure admitted through a pipe 65, thus pivoting actuating member 15 in a clockwise direction through the medium of piston rod 36. Actuating member 15, through the first pair of parallel tension members 18, pivots the first actuated member 16 in a clockwise direction also, thus exerting an upward pull on valve operating rod 6 through the medium of the bifurcated end 45 of the first actuated member 16. The second actuated member 17 is also pivoted in a clockwise direction, by means of the second pair of parallel tension members 19 pivotally interconnecting the first and second actuated members, thereby exerting an upward pull on valve operating rod 7 through the bifurcated end 62. When valve rods 6 and 7 are pulled upward, the cross member 5 is raised thereby opening the intake valves 3 in succession to supply steam to a turbine through the inlet passages 9.

To close the valves 3, springs 63 and 64 connected respectively on the valve rods 6 and 7 act in conjunction with spring 25 of the hydraulic motor 21 to reverse the movement of the valve gear 10.

It will be apparent from the above description that main frame plate 11 forms a rigid cantilever beam reenforced by truss pedestal 12 to prevent deflection of the projecting end 20 thereof. It will also be apparent that actuating member 15 and actuated members 16 and 17 are relatively short members of rigid structure thereby offering a substantial resistance to bending, and that members 18 and 19, which provide the necessary length to the linkage, are tension members and therefore are not subject to deflection and bending.

We have, therefore, provided a valve gear of improved resistance to bending or deflecting of its members thereby making possible the mounting of an oil pressure motor at a safe distance laterally disposed from the valve operating rods of a steam turbine or like machine to prevent fire hazard due to oil leaking from the hydraulic motor, while permitting accurate regulation of steam supplied to the machine.

While the motor 21 has been represented as a hydraulic cylinder, it will be obvious that other suitable types of linear or cam actuators might also be used to position the horizontal arm 15.

While we have shown and described a particular embodiment of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. In a valve gear for an elastic fluid turbine or like machine, the combination of an elongated horizontally disposed main frame member adapted to support a hydraulic motor on one end thereof and having another portion adapted to be secured to the frame of the machine, a truss pedestal projecting upward from the frame member adjacent the motor end thereof, a first bell-crank actuating lever member having a first pair of vertically disposed spaced parallel arms and a second pair of horizontally disposed spaced parallel arms connected to a bridge frame member with an end portion adapted to be connected to the hydraulic motor, pivot means connecting the mid-portion of said actuating lever member to the truss pedestal for pivotal movement about a horizontal axis transverse to the main frame, a second pedestal member disposed vertically above the main frame and secured thereto in spaced relation to the truss pedestal, a second bell-crank actuated member having a pair of spaced parallel vertically disposed arms and a pair of horizontally disposed spaced parallel arms with end portions secured to a bridge frame member having an end portion adapted to be pivotally secured to a valve actuating member, universal pivot means supporting the actuated member on said second pedestal for pivotal motion about a horizontal axis and limited oscillation about a vertical axis, and a pair of horizontally disposed parallel tension links having end portions pivoted to the respective vertical arms of said actuating and actuated members, whereby differential thermal expansion of said tension links produces slight oscillation about a vertical axis of said actuated bell-crank lever member.

2. In a valve actuating gear for an elastic fluid turbine or like machine, the combination of a horizontally disposed main frame member adapted to support actuating motor means on one end thereof and having another portion adapted to be secured to the frame of the machine, a first pedestal member projecting upward from the frame member adjacent the motor end thereof, a first bell-crank lever member having a pair of spaced parallel vertical arms and a horizontally disposed arm member within an end portion adapted to be connected to the motor, pivot means supporting the mid-portion of said first lever on the first pedestal for pivotal movement about a horizontal transverse axis, a second pedestal member disposed vertically above the frame member and secured thereto in spaced relation to the first pedestal, a second bell-crank lever member having a pair of spaced parallel vertical arms disposed on either side of the second pedestal and a horizontally disposed arm with an end portion adapted to be connected to a valve actuating member, universal pivot means supporting said second lever member on the second pedestal for pivotal movement about a horizontal axis and limited oscillation about a vertical axis, and a pair of horizontally disposed parallel tension links with end portion pivoted to the respective ends of the vertical arms of the first and second bell-cranks whereby any differential thermal expansion occurring between said tension links will produce slight oscillatory adjustment of the second bell-crank about a vertical axis.

3. In a valve actuating gear for an elastic fluid turbine or like machine, the combination of an elongated horizontally disposed frame member adapted to support actuator means on one end thereof and having another portion adapted to be secured to the frame of the machine, a first pedestal member projecting upward from the frame adjacent the actuator end thereof, a first bell-crank actuating lever member having a pair of vertical spaced parallel arms and a horizontally disposed arm member with an end portion adapted to be connected to the actuator, pivot means connecting the mid-portion of said actuating lever member to the first pedestal for pivotal movement about a horizontal axis transverse to the frame, a second pedestal member disposed vertically above the frame and secured thereto in spaced relation to the first pedestal, a second bell-crank lever member having a pair of spaced parallel vertical arms disposed on either side of the second pedestal and a horizontally disposed arm member with an end portion adapted to be connected to a first valve actuating member, first universal pivot means supporting said second lever member on said second pedestal for pivotal motion about a horizontal transverse axis and limited oscillation about a vertical axis, a third pedestal member disposed vertically above the frame and secured thereto in spaced relation to the second pedestal at the side thereof remote from said first pedestal, a third bell-crank lever member with a pair of vertical spaced parallel arms disposed at either side of said third pedestal and a horizontally disposed arm with an end portion adapted to be connected to a second valve actuating member, second universal pivot means supporting said third bell-crank member on said third pedestal for pivotal motion about a horizontal transverse axis and limited oscillation about a vertical axis, a first pair of horizontally disposed parallel links having end portions pivoted to the respective vertical arms of said first and second bell-crank levers, and a second pair of horizontally disposed parallel links having end portions pivoted to the vertical arms of said second and third bell-crank levers, whereby any differential thermal expansion occurring in said links can effect slight oscillation about a vertical axis of said second and third bell-cranks.

FRANCIS H. VAN NEST.
LAWRENCE B. WALES.

REFERENCES CITED

The following references are of record in the file of this patent:

UNITED STATES PATENTS

| Number | Name | Date |
| --- | --- | --- |
| 528,483 | Nixon | Oct. 30, 1894 |
| 628,101 | Lewis | July 4, 1899 |
| 936,261 | Warren | Oct. 5, 1909 |